(12) United States Patent
Cairns et al.

(10) Patent No.: US 7,778,312 B2
(45) Date of Patent: Aug. 17, 2010

(54) METHOD AND APPARATUS FOR SELECTING DEMODULATION PROCESSING DELAYS IN A RECEIVER

(75) Inventors: Douglas A. Cairns, Durham, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 559 days.

(21) Appl. No.: 11/402,676

(22) Filed: Apr. 12, 2006

(65) Prior Publication Data

US 2006/0182204 A1 Aug. 17, 2006

Related U.S. Application Data

(63) Continuation-in-part of application No. 10/959,923, filed on Oct. 6, 2004, which is a continuation-in-part of application No. 09/845,950, filed on Apr. 30, 2001, now Pat. No. 6,922,434.

(60) Provisional application No. 60/257,439, filed on Dec. 22, 2000.

(51) Int. Cl.
*H04B 1/00* (2006.01)

(52) U.S. Cl. .................. 375/150; 375/143; 375/145; 375/147; 375/149; 375/368; 375/152; 375/316; 375/354; 375/367

(58) Field of Classification Search .................. 375/143, 375/145, 147, 149, 150, 152, 316, 354, 367 375/368
See application file for complete search history.

(56) References Cited

U.S. PATENT DOCUMENTS

| | | | | |
|---|---|---|---|---|
| 5,572,552 A | | 11/1996 | Dent et al. | |
| 5,796,788 A | * | 8/1998 | Bottomley | .................. 375/341 |
| 5,818,866 A | * | 10/1998 | Wilk | .................. 375/149 |
| 5,974,080 A | * | 10/1999 | Papasakellariou | .................. 375/149 |
| 6,078,611 A | * | 6/2000 | La Rosa et al. | .................. 375/147 |
| 6,275,483 B1 | * | 8/2001 | Papasakellariou et al. | ... 370/335 |

(Continued)

OTHER PUBLICATIONS

Gregory E. Bottomley, A genealized RAKE receiver for interference suppression, IEEE journal on selected areas in communicaitons, vol. 18, No. 8, Aug. 2000 (1536-1545).*

(Continued)

*Primary Examiner*—Chieh M Fan
*Assistant Examiner*—Siu M Lee
(74) *Attorney, Agent, or Firm*—Coats & Bennett, P.L.L.C.

(57) ABSTRACT

A receiver includes a baseband processor for selecting a set of demodulation processing delays for received signal demodulation from a larger set of candidate delays. In one embodiment, the baseband processor selects the set of demodulation processing delays by calculating at least one metric for each demodulation processing delay in the set of candidate delays, iteratively reducing the set of candidate delays by eliminating one or more demodulation processing delays from the set as a function of comparing the metrics, and setting the processing delays for received signal demodulation to the candidate delays remaining after reduction. In a Generalized RAKE (G-RAKE) embodiment, the metric corresponds to combining weight magnitudes associated with G-RAKE finger delays. In a chip equalizer embodiment, the metric corresponds to coefficient magnitudes associated with equalization filter tap delays. In other embodiments, the metric corresponds to Signal to Interference Ratios (SIRs) associated with the set of candidate delays.

13 Claims, 5 Drawing Sheets

U.S. PATENT DOCUMENTS

| | | | |
|---|---|---|---|
| 6,363,104 | B1 | 3/2002 | Bottomley |
| 6,370,397 | B1* | 4/2002 | Popovic et al. ............... 455/561 |
| 6,408,039 | B1* | 6/2002 | Ito .............................. 375/347 |
| 6,683,906 | B1* | 1/2004 | Iwamatsu ................... 375/142 |
| 6,683,924 | B1 | 1/2004 | Ottosson et al. |
| 6,757,345 | B1* | 6/2004 | Heinila ....................... 375/349 |
| 6,778,592 | B1* | 8/2004 | Haga et al. .................. 375/148 |
| 6,922,434 | B2 | 7/2005 | Wang et al. |
| 2002/0051485 | A1* | 5/2002 | Bottomley .................. 375/147 |
| 2004/0066841 | A1* | 4/2004 | Jonsson ...................... 375/148 |
| 2005/0078742 | A1 | 4/2005 | Cairns et al. |
| 2005/0243898 | A1* | 11/2005 | Reznik et al. ............... 375/147 |

OTHER PUBLICATIONS

Gregory E. Bottomley, Tony Ottosson and Yi-Pin Eric Wang, A generalized RAKE receiver for DS-CDMA systems, IEEE VTC2000 dated May 2000.*

Yi-Pin Eric Wang and Gregory E. Bottomley, Generalized RAKE reception for cancelling interference from multiple base stations, IEEE VTC2000, dated Sep. 2000.*

Yi-Pin Eric Wang and Gregory E. Bottomley, Generalized Rake reception for cancelling interference from multiple base stations, IEEE VTC 2000, dated Sep. 2000.*

Kutz, G. and Chass, A., "Low Complexity Implementation of a Downlink CDMA Generalized RAKE Receiver." In Proc. IEEE Vehicle Technology Conference. Sep. 24-28, 2002. 5 pages. Vancouver, Canada.

Kutz, G. and Chass, A., "On the Performance of a Practical Downlink CDMA Generalized RAKE Receiver." In Proc. IEEE Vehicle Technology Conference. Sep. 24-28, 2002. 5 pages. Vancouver, Canada.

Hasegawa, T. and Shimizu, M., "Multipath Interference Reduction Method using Multipath Interference Correlative Timing for DS-CDMA Systems." in Proc. IEEE Vehicle Technology Conference. May 6-9. pp. 1205-1209. Birmingham, Alabama.

Hasegawa,T. and Shimizu, M., "Multipath Interference Reduction Property by Using Multipath Interference Correlative Timing Throughout for DS-CDMA Systems." In Proc. IEEE Vehicle Technology Conference. Apr. 22-25, 2003. pp. 2827-2831. Seoul, Korea.

Cairns, D. et. al., Method and Apparatus for Parameter Estimation in a Generalized RAKE Receiver. U.S. Appl. No. 10/800167, filed Mar. 12, 2004.

Scharf, L.. L., "Rudiments of Linear Algebra and Multivariate Normal Theory." *Statistical Signal Processing: Detection, Estimation, and Time Series Analysis*. Jul. 1991. pp. 52-55. Addison-Wesley Publishing Company, Inc.

Co-pending U.S. Appl. No. 11/566,256, filed Dec. 4, 2006.

Co-pending U.S. Appl. No. 11/935,840, filed Nov. 7, 2007.

Cotter, S. F. et al. "Efficient Backward Elimination Algorithm for Sparse Signal Representation Using Overcomplete Dictionaries." IEEE Signal Processing Letters, vol. 9, No. 5, May 2002, pp. 145-147.

Kutz, G. et al. "Determination of Tap Positions for Sparse Equalizers." IEEE Transactions on Communications, vol. 5, No. 9, Sep. 2007, pp. 1712-1724.

Cotter, S. F. et al. "Backward Sequential Elimination for Sparse Vector Subset Selection." (Abstract only). Signal Processing, vol. 81, No. 9, Sep. 2001, pp. 1849-1864.

* cited by examiner

METHOD AND APPARATUS FOR SELECTING DEMODULATION PROCESSING DELAYS IN A RECEIVER

RELATED APPLICATION

The present application is a continuation-in-part of U.S. patent application Ser. No. 10/959,923, filed Oct. 6, 2004, which is a continuation-in-part of U.S. patent application Ser. No. 09/845,950, filed Apr. 30, 2001, now U.S. Pat. No. 6,922, 434 which claims priority to U.S. Provisional Application Ser. No. 60/257,439, filed Dec. 22, 2000. The disclosures of the aforementioned U.S. patent application Ser. No. 10/959, 923, U.S. patent application Ser. No. 09/845,950, and U.S. Provisional Application Ser. No. 60/257,439 are incorporated herein by reference in their entireties.

BACKGROUND

The present invention generally relates to wireless communication receivers, and particularly relates to the selection of demodulation processing delays in wireless communication receivers.

Advanced communication systems provide flexible voice and data services. Many advanced communication networks are based on direct-sequence code-division multiple-access (DS-CDMA). For example, cdma2000 is prevalent in North America while wideband CDMA (WCDMA) is deployed throughout Europe and Japan. These advanced communication systems provide increased system bandwidth, i.e., wider bandwidth, to satisfy the performance requirements associated with feature-rich services.

A pseudorandom noise (PN) sequence is used to spread the spectrum of a DS-CDMA signal waveform. The rate of the spreading sequence, i.e., the chip rate, is chosen so that the bandwidth of the filtered signal is several times the bandwidth of the original signal. As such, each information symbol to be transmitted is represented by a number of chips. Representing one symbol by many chips enables spreading. Conventional DS-CDMA networks may utilize multiple PN sequences. In addition, such networks may use orthogonal spreading codes of known lengths to ensure orthogonality between signals intended for different users. Spread signals are then up-converted to a carrier frequency and transmitted over a communication channel. The communication channel causes multipath signal propagation, thus causing multiple resolvable echoes of the transmitted signal, also referred to as rays or images.

RAKE and Generalized RAKE (G-RAKE) receivers are conventionally used to receive and process DS-CDMA signals transmitted in advanced communication networks such as cdma2000 and WCDMA based networks. RAKE receivers treat the effects of multipath fading on signal interference, which may consist of intersymbol interference (ISI), multi-user interference (MUI), inter-path interference (IPI) and thermal noise, as Additive White Gaussian Noise (AWGN). However, a multipath fading channel often causes significant spectral distortion of the overall interference, thus causing colored interference. G-RAKE receivers improve upon RAKE receivers in that they suppress colored Gaussian noise arising from multipath propagation and pulse-shaping by using selective finger placement techniques and combining weights to account for the color of the interference. As part of receive signal despreading, G-RAKE receivers determine where to place 'finger' delays, i.e., demodulation processing delays associated with one or more receiver antennas. The selected delays are provided to a correlation unit, which despreads one or more traffic channels by assigning the selected delays to various correlators, thereby producing traffic despread values. The selected delays may align some correlators to signal paths associated with a multipath fading channel to collect signal energy and may align other correlators off the signal paths to characterize colored interference. In addition, the selected delays are also provided to a weight computation unit which computes combining weights. The traffic despread values produced by the correlators are then combined in a combiner unit in accordance with the combining weights to produce soft bit values.

Functionality similar to that provided by G-RAKE receivers is supplied by conventional chip equalizers. Chip samples are provided to a baseband processor included in a chip equalizer. The baseband processor comprises a Finite Impulse Response (FIR) filter for equalizing chip samples received from a multipath channel. The FIR filter includes a number of taps corresponding to filter delays. Tap delays are selected in a similar manner as finger delays are selected in a G-RAKE receiver, that is, to tradeoff between whitening the overall colored interference and collecting the energy of the desired signal. The selected tap delays are weighted according to filter weighting coefficients generated by a weight computation unit. The FIR filter filters the chip samples, thus producing a signal that is then despread by a correlator to produce soft bit values.

Receivers that whiten colored noise interference such as G-RAKE and chip equalizer based receivers have a limited quantity of signal processing resources available for baseband signal processing, e.g., correlators or equalization filter taps. Because of the limited processing resources available for processing a multipath fading signal, only a subset of available demodulation processing delays may be assigned to the processing resources. As such, selection of delays assigned to signal processing resources included in conventional G-RAKE and chip equalizer receivers is a delicate tradeoff between matching to a multipath fading channel and whitening of colored noise.

SUMMARY

According to the methods and apparatus taught herein, a set of demodulation processing delays for received signal demodulation are selected from a larger set of candidate delays in accordance with a metric. In a Generalized RAKE (G-RAKE) embodiment, the metric corresponds to combining weight magnitudes associated with G-RAKE finger delays. In a chip equalizer embodiment, the metric corresponds to combining weight magnitudes associated with equalization filter tap coefficients. In other embodiments, the metric corresponds to Signal to Interference Ratios (SIRs) associated with the set of candidate delays. The selected set of demodulation processing delays is thus optimized with respect to the particular metric, thus enabling a receiver to balance between whitening the overall colored interference associated with a signal received from a multipath fading channel and matching to the multipath fading channel.

In one embodiment, the set of demodulation processing delays are selected by calculating at least one metric for each demodulation processing delay in the set of candidate delays, iteratively reducing the set of candidate delays by eliminating one or more demodulation processing delays from the set as a function of comparing the metrics, and setting the processing delays for received signal demodulation to the candidate delays remaining after reduction. In some embodiments, the metric is a combining weight magnitude based on channel estimates and impairment correlations determined for the set of candidate delays. In other embodiments, the metric is a SIR based on the channel estimates and impairment correlations.

A receiver corresponding to the above methods comprises a baseband processor configured to select a set of the demodulation processing delays for received signal demodulation from the larger set of candidate delays by calculating at least one metric for each demodulation processing delay in the set of candidate delays, iteratively reducing the set of candidate delays by eliminating one or more demodulation processing delays from the set as a function of comparing the metrics, and setting the processing delays for received signal demodulation to the candidate delays remaining after reduction.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
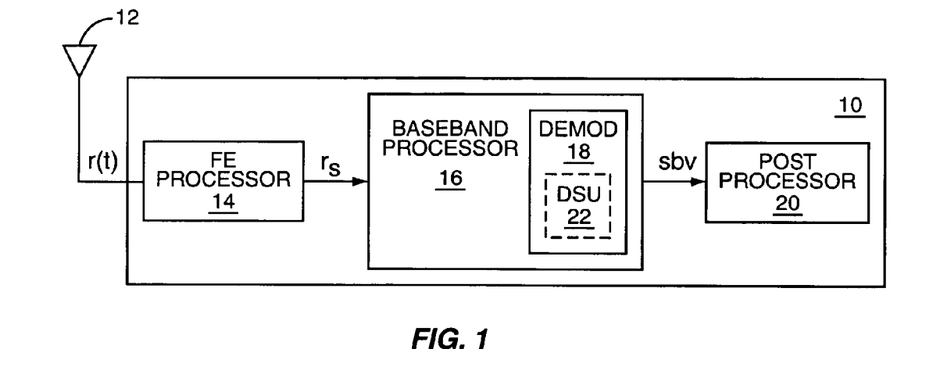
FIG. 1 is a block diagram of one embodiment of a wireless communication receiver having a demodulation processing delay selection unit.

FIG. 1 illustrates a receiver 10 for receiving and processing a signal, e.g., a direct-sequence code-division multiple-access (DS-CDMA) signal, transmitted over one or more multipath fading channels (not shown). The receiver comprises at least one antenna 12, a front end processor 14, a baseband processor 16 including a demodulation circuit 18, and a post processor 20. The antenna(s) 12 receives transmitted signals from multipath fading channel(s) while the front end processor 14 filters and down-converts the received signals to produce baseband signals ($r_c$). The baseband processor 16 produces soft bit values (sbv) or symbol estimates based on the baseband signals and the post processor 20 performs other signal processing operations on the soft bit values, such as error correction decoding. Particularly, the demodulation circuit 18 comprises various signal processing resources (not shown) for demodulating baseband signals transmitted over a multipath fading channel such as Generalized RAKE (G-RAKE) fingers or chip equalizer filter taps.

Each signal processing resource is assigned a demodulation processing delay, e.g., a G-RAKE finger delay or equalization filter tap delay, from a candidate set of delays for use in processing the baseband signals. Some delays may be assigned to particular signal paths associated with the multipath fading channel for matching to the multipath fading channel. Other delays may be assigned off the signal paths, i.e., delays not corresponding to signal echoes, for characterizing colored noise interference. It will be understood that with multiple receive antennas, the same time delays may be used on all antennas or delay selection may include determining a receive antenna as well as a time delay. In soft handoff, delay selection may also include transmit antenna selection. In transmit diversity, the transmit antennas typically use the same spreading codes, so that transmit antenna selection will not be needed. In the remainder, embodiments are described in terms of "delay selection." It will be understood that with multiple antennas and/or soft handoff situation, delay selection may include antenna selection. Because there are a limited number of signal processing resources available to the demodulation circuit 18, a delay selection unit 22 is included in or associated with the demodulation circuit 18 for selecting a set of the delays from the candidate delays for use by the signal processing resources. Proper selection of the demodulation processing delays enables the receiver 10 to better balance between whitening the overall colored interference and matching to the multipath fading channel(s). The delay selection unit 22 identifies the best subset of candidate delays to use for signal demodulation.

Figure 2:
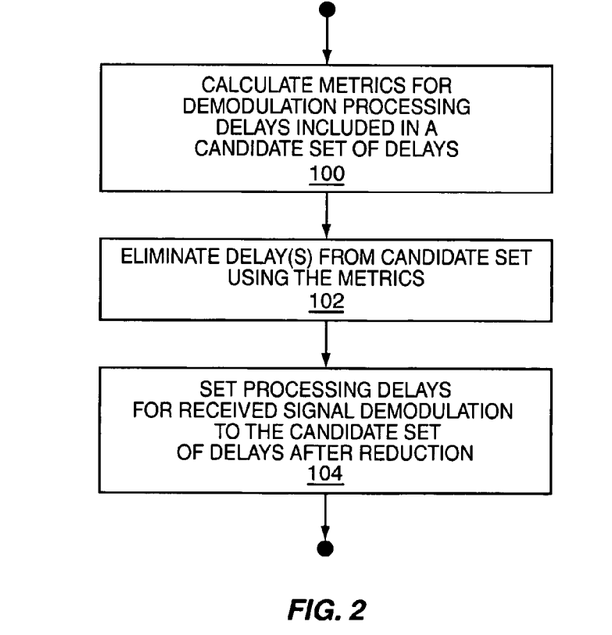
FIG. 2 is a logic flow diagram of one embodiment of processing logic for selecting a set of demodulation processing delays from a candidate set of delays.

The delay selection unit 22 selects a set of demodulation processing delays from a candidate set of delays according to a metric. FIG. 2 illustrates an embodiment of processing logic for selecting a set of delays by the delay selection unit 22 in accordance with a particular metric. The logic "begins" with a metric being calculated for each demodulation processing delay in the set of candidate delays (Step 100). The delay selection unit 22 reduces the set of candidate delays by eliminating one or more demodulation processing delays from the set as a function of comparing the metrics (Step 102). The delay selection unit 22 then sets the processing delays for received signal demodulation to the candidate delays remaining after reduction (Step 104). As such, the selected delays are effectively assigned to the signal processing resources by the delay selection unit 22. The signal processing resources process baseband signals using the assigned delays, thus optimally whitening the overall colored interference and matching to the multipath fading channel in accordance with the particular metric used to select the delays.

In one embodiment, the metrics used by the delay selection unit 22 for selecting delays are the magnitudes of the combining weights (w), i.e., the weights assigned to the signal processing resources of the demodulation circuit 18. Note that these combining weights may be different than the weights used in demodulation. The combining weights determine the amount of influence each signal processing resource has on overall signal demodulation processing, e.g., G-RAKE combining weights or chip equalization filter tap coefficients. Regardless, the combining weights can be calculated by solving a system of equations, which can be expressed as:

$$w_J = \mathbb{R}_J^{-1} c_J \quad (1)$$

where $\mathbb{R}_J$ is an impairment covariance matrix associated with J demodulation processing delays, e.g., a noise and interference covariance matrix or a pilot despread value matrix and $c_J$ is a channel coefficient vector corresponding to channel characteristic estimates associated with one or more multipath fading channels.

Figure 3:
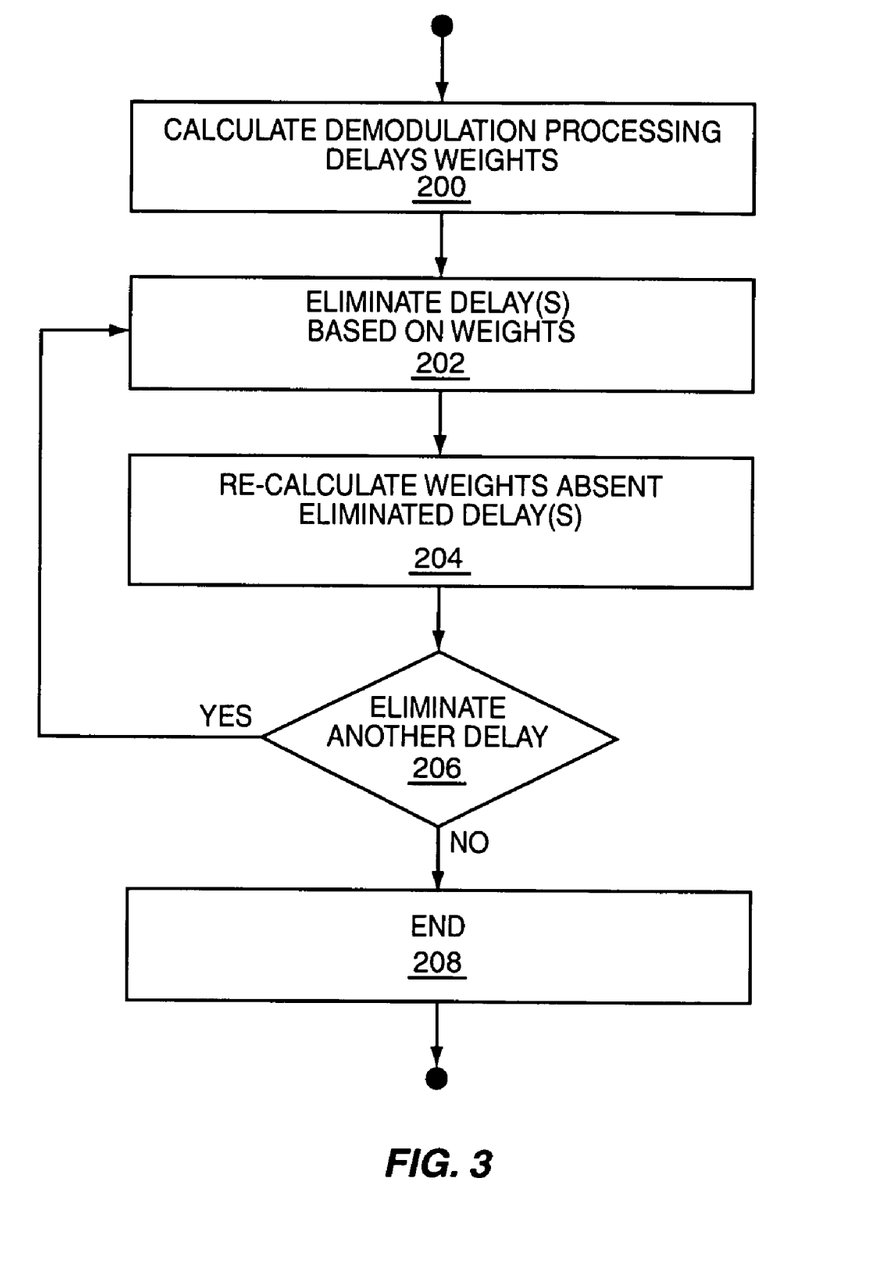
FIG. 3 is a logic flow diagram of one embodiment of processing logic for selecting a set of demodulation processing delays from a candidate set of delays based on combining weights.

As such, the combining weights are calculated by the baseband processor 16 in accordance with equation (1), as illustrated by Step 200 of FIG. 3. To the extent that there are more candidate delays than desired for signal demodulation, the delay selection unit 22 reduces the set of demodulation processing delays by eliminating one or more delays having the smallest weight magnitude(s), as illustrated by Step 202 of FIG. 3. Because the smallest weight magnitudes make the least contribution to demodulation signal processing, their corresponding delays are removed from the candidate set of delays as needed to identify a reduced set of the "best" delays to use. The weights are recalculated according to equation (1) when one or more delays are removed from the set, thus negating the effect that the eliminated delay has on the impairment covariance matrix, as illustrated by Step 204 of FIG. 3. The operations of eliminating one or more delays from the set and recalculating the combining weights is repeated by the delay selection unit 22 until the set contains a desired number of delays, as illustrated by Step 206 of FIG. 3. The desired number of delays may correspond to the number of signal processing resources available to the demodulation circuit 18. When the delay element threshold is satisfied, the receiver 10 has identified an optimized set of demodulation processing delays in accordance with the combining weight metric, as illustrated by Step 208 of FIG. 3. In this particular example, the set of delays comprises those delays having the greatest weighting factors, e.g., the largest combining weight magnitudes.

In one embodiment, the combining weights may be recalculated during iterative delay elimination by using a simplified approach that more efficiently calculates the inverse impairment covariance matrix $\mathbb{R}$. The weights are recalculated by re-computing the impairment covariance matrix $\mathbb{R}$ after a candidate delay has been eliminated, removing the entry from the channel coefficient vector that corresponds to the eliminated delay, and recalculating the weights in accordance with equation (1). In one example, the matrix $\mathbb{R}_{J-1}^{-1}$ may be computed in accordance with a $(J-1)\times(J-1)$ inverse matrix computation when one delay is eliminated from the set. However, the inverse impairment covariance matrix $\mathbb{R}$ for $J-1$ delays may be computed from the inverse impairment covariance matrix $\mathbb{R}$ for $J$ delays if $\mathbb{R}_J^{-1}$ is represented as:

$$R_J^{-1} = \begin{bmatrix} Q_{J-1} & b \\ b^H & a \end{bmatrix} \quad (2)$$

where the column vector $[b\ a]^T$ represents the elements of the inverse impairment covariance matrix associated with the candidate delay that is to be eliminated. To determine the combining weights for the next iteration i, $\mathbb{R}_{J-i}^{-1}$ is obtained by:

$$R_{J-i}^{-1} = Q_{J-1} - bb^H\left(\frac{1}{a}\right) \quad (3)$$

where equation (3) follows from equation (2) through application of the partitioned matrix inversion lemma.

As such, the inverse impairment covariance matrix for $J-1$ delays may be obtained from the inverse impairment covariance matrix for $J$ delays by subtracting a scaled version of the outer product of covariance elements that are removed. The matrix computations of equations (2) and (3) eliminate the last delay in the impairment covariance matrix. Because the delay selection unit may remove any arbitrary demodulation processing delay, the impairment covariance matrix $\mathbb{R}_{J-i}^{-1}$ is manipulated so that the delay to be eliminated is repositioned to the last delay position of the matrix by:

$$\tilde{\mathbb{R}}_J^{-1} = P^T \mathbb{R}_J^{-1} P \quad (4)$$

where $P$ is a sparse permutation matrix filled with zeros and a single 1 per row/column. Equations (2) and (3) are applied to $\tilde{\mathbb{R}}_J^{-1}$ to calculate the inverse impairment covariance matrix. The matrix $\tilde{\mathbb{R}}_J^{-1}$ is recalculated each time a candidate delay is eliminated by the delay selection unit 22, thus obtaining $\tilde{\mathbb{R}}_{J-i-1}^{-1}$ from $\tilde{\mathbb{R}}_{J-i}^{-1}$.

In another embodiment, the metric used by the delay selection unit 22 to select a set of demodulation processing delays from the candidate set of delays corresponds to a Signal-to-Interference Ratio (SIR) associated with J delays:

$$SIR = w^H c \quad (5)$$

where $w^H$ is the Hermitian transpose of the combining weights w. SIR can be expressed in terms of the covariance matrix R using the following relationship:

$$w^H c = c^H R^{-1} c \quad (6)$$

Figure 4:
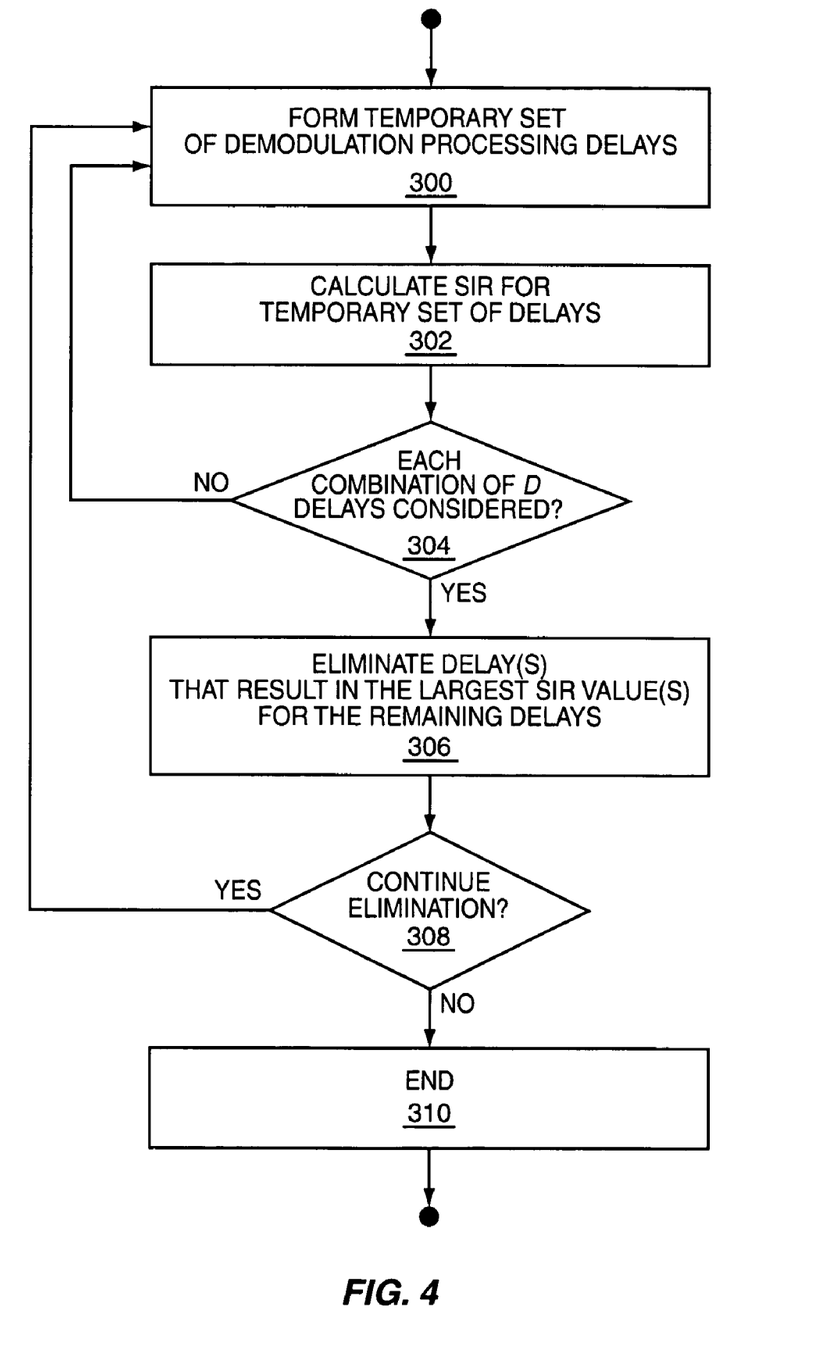
FIG. 4 is a logic flow diagram of one embodiment of processing logic for selecting a set of demodulation processing delays from a candidate set of delays based on Signal to Interference Ratios.

The delay selection unit 22 forms a temporary set of demodulation processing delays by eliminating a group of D candidate delays from the temporary set, as illustrated by Step 300 of FIG. 4. An SIR value is calculated for the temporary set of delays, as illustrated by Step 302 of FIG. 4. The operations of forming a temporary set and calculating an SIR value for each temporary set are repeated by the delay selection unit 22 until all combinations of D candidate delays have been excluded from at least one temporary set, as illustrated by Step 304 of FIG. 4. As such, the effect each group of candidate delays has on SIR is measurable. That is, for each delay (D=1) or set of delays (D>1) excluded from the temporary set, the delay selection unit 22 calculates the SIR that would be obtained by not using the excluded delay(s) during demodulation signal processing. In one embodiment, SIR values are calculated for all temporary delay sets in each iteration and each SIR value corresponding to a candidate delay or group of candidate delays is stored for subsequent analysis. In a memory-optimized embodiment, only an index is maintained that identifies the delay or group of delays that has the least impact on SIR. If a subsequent delay or group of delays has a lesser impact on SIR than the currently indexed delay or group of delays, the index is updated to point to the subsequent delay or group. Regardless, after the SIR values have been calculated, the delay selection unit 22 eliminates from the set of candidate delays the delays or groups of delays that result in the largest estimated SIR value(s) for the remaining delays, as illustrated by Step 306 of FIG. 4. After eliminating one or more delays from the set of candidate delays, the process of calculating SIR values is repeated using the reduced set of candidate delays, as illustrated by Step 308 of FIG. 4. This two-step iterative process is repeated by the delay selection unit 22 until the set contains a desired number of delays. At that point, the delay selection unit 22 has identified an SIR values is repeated using the reduced set of candidate delays, as illustrated by Step 308 of FIG. 4. This two-step iterative process is repeated by the delay selection unit 22 until the set contains a desired number of delays. At that point, the delay selection unit 22 has identified an optimized set of candidate delays in accordance with the SIR metric, as illustrated by Step 310 of FIG. 4. As such, the set of delays used by the signal processing resources of the demodulation circuit 18 comprises a subset of delays yielding the combination of delays that provide the largest estimated SIR.

Figure 5:
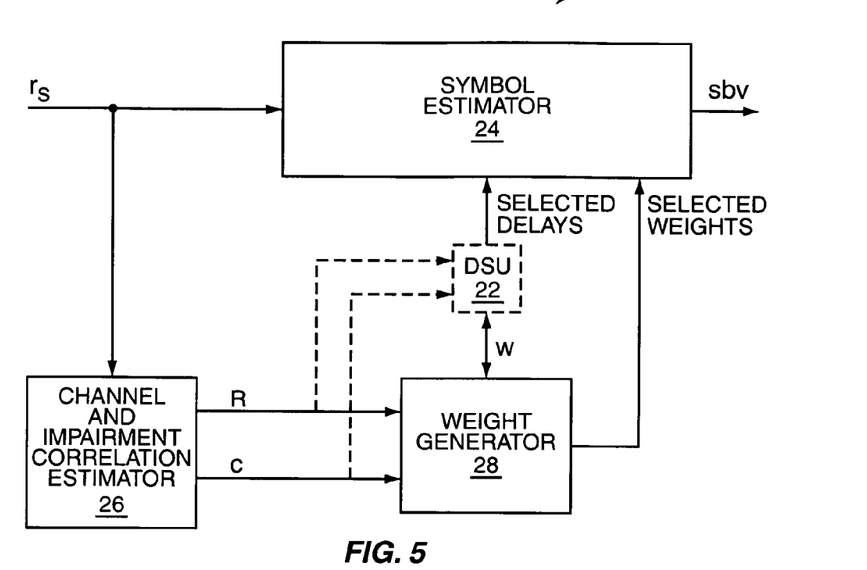
FIG. 5 is a block diagram of one embodiment of a demodulation circuit included in the receiver of FIG. 1.

FIG. 5 illustrates a more detailed illustration of the demodulation circuit 18 included in the baseband processor 16. The demodulation circuit 18 comprises a symbol estimator 24, a Channel and Impairment Correlation estimator (CIC estimator) 26 and a weight generator 28. The CIC estimator 26 can be configured to obtain impairment correlations for combining weight generation in a variety of ways. The impairment correlations represent a statistical estimation of signal impairment correlations of multiple received signal images and are equivalent to the covariance when their mean value is zero. In one embodiment, the CIC estimator 26 estimates the impairment covariance matrix $\mathbb{R}$ from chip samples or despread values of pilot or data components of received signals. In another embodiment, the CIC estimator 26 estimates the impairment covariance matrix $\mathbb{R}$ parametrically.

In one non-parametric embodiment, the CIC estimator 26 generates the impairment covariance matrix $\mathbb{R}$ by calculating impairment covariance estimates associated with the demodulation processing delays. That is, for a J×J impairment covariance matrix $\mathbb{R}$, the $(i,j)^{th}$ matrix entry represents the covariance between impairment terms associated with the $i^{th}$ and $j^{th}$ demodulation processing delays, e.g., the impairment covariance between the $i^{th}$ and $j^{th}$ finger delay or equalization filter tap. The CIC estimator 26 calculates impairment covariance estimates based on chip data samples or despread values and channel estimates (c), i.e., estimates of channel responses from each base station (not shown) to the receiver 10. Particularly, the CIC estimator 26 determines impairment cross-correlations from despread pilot values and corresponding channel estimates. The measurements can be smoothed over time, e.g., over multiple time slots.

In a parametric embodiment, the CIC estimator 26 calculates impairment covariance estimates based on a model of the impairment covariance. The model consists of structured elements and scaling parameters. The structured elements are computed from channel estimates while the scaling parameters are determined by fitting the model to a measured impairment covariance matrix. The scaling parameters and structure elements are then combined to produce an impairment covariance estimate.

Regardless, the weight generator 28 of the demodulation circuit 18 generates combining weights (w) corresponding to each of the candidate demodulation processing delays. That is, the weight generator 28 produces a weight value associated with each of the candidate delays, e.g., combining weights in a G-RAKE embodiment and equalization filter tap coefficients in a chip equalizer embodiment. The weight generator 28 produces combining weights based on the channel estimates (c) and impairments covariance (R). The weights that correspond to the set of candidate delays selected by the delay selection unit 22 may be provided to the symbol estimator 24 for use in demodulation signal processing. Alternatively, the weights may be discarded if the selected delays are not used until a future time slot.

Figure 6:
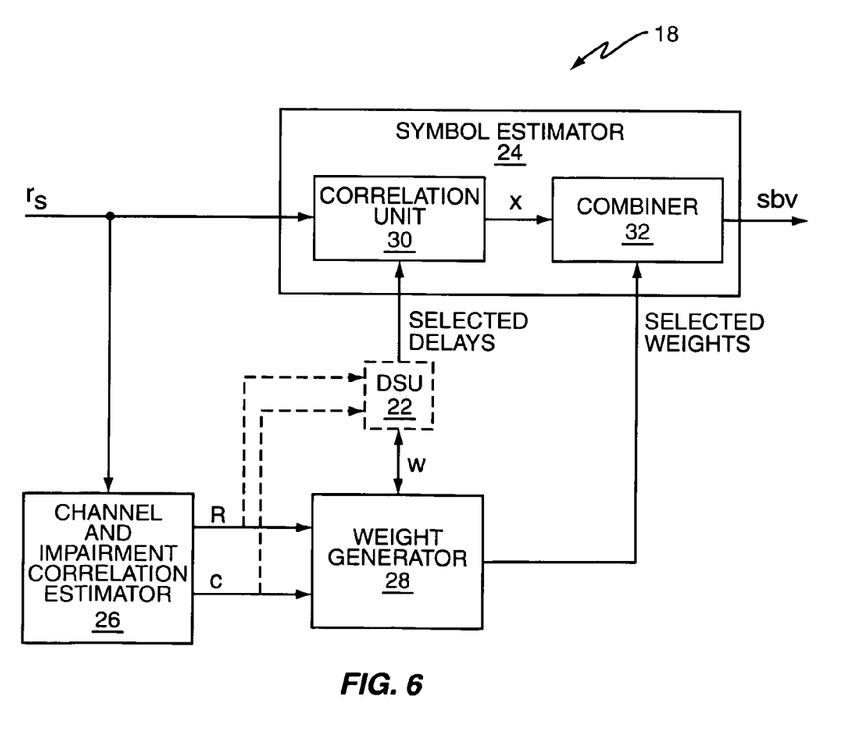
FIG. 6 is a block diagram of one embodiment of a Generalized RAKE demodulation circuit included in the receiver of FIG. 1.

The symbol estimator 24 of the demodulation circuit 18 produces soft bit values (sbv) or symbol estimates from baseband signals $r_s$ based on the set of demodulation processing delays selected by the delay selection unit 22 and the corresponding selected combining weights. FIG. 6 illustrates a G-RAKE embodiment of the demodulation circuit 18. According to the G-RAKE embodiment, signal processing resources of the symbol estimator 24 include a correlation unit 30 and a combiner 32. The correlation unit 30, which contains a plurality of fingers (not shown), despreads one or more traffic channels using the delays provided by the delay selection unit 22 and a corresponding spreading code sequence. With multi code reception, multiple spreading codes may be used. The correlator fingers may comprise one or more of traffic channel fingers, pilot channel fingers and probing fingers. Each correlator finger has an associated delay, receive antenna and spreading code (not shown). The correlators generate despread values using the received chip samples and the spreading code sequence. The despread values (x) are then combined by the combiner 32 to yield soft bit values (sbv) or symbol estimates, where the combiner 32 weights each finger's output value with a corresponding combining weight produced by the weight generator 28.

Figure 7:
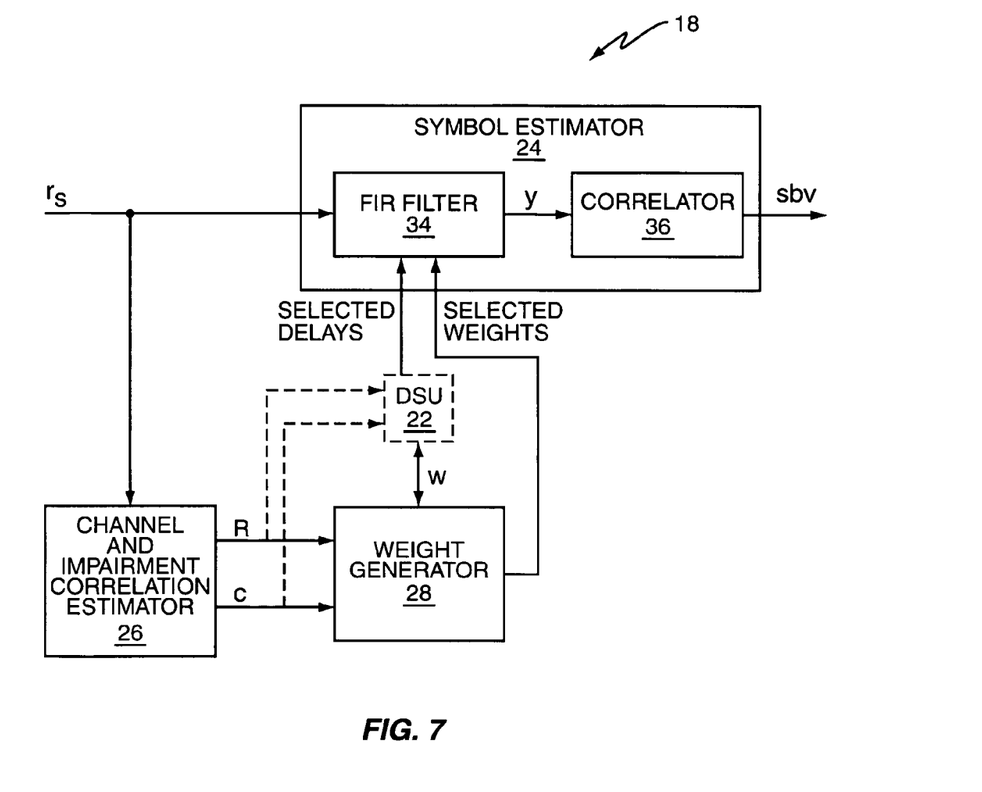
FIG. 7 is a block diagram of one embodiment of a chip equalizer demodulation circuit included in the receiver of FIG. 1.

FIG. 7 illustrates a chip equalizer embodiment of the demodulation circuit 18. According to the chip equalizer embodiment, signal processing resources of the symbol estimator 24 include an equalization Finite Impulse Response (FIR) filter 34 and a correlator 36. With multi code reception, multiple correlators may be used. The FIR filter 34 produces filtered values (y) by filtering received baseband signals ($r_s$) using a set of equalization filter tap delays (and associated receive antennas) that have been selected by the delay selection unit 22 from a larger candidate set of filter tap delays. Each selected filter tap is weighted using a corresponding selected weight produced by the weight generator 28. The correlator 36 yields soft bit values (sbv) or symbol estimates by despreading the filtered values using the filtered values and a corresponding spreading code sequence.

Regardless of the symbol estimator implementation, the delay selection unit 22 selects an optimized set of demodulation processing delays from a larger candidate set of delays for use by the demodulation circuit 18, the delays being selected in accordance with a metric such as combining weight magnitudes or SIR. The optimized set of selected delays enables the receiver 10 to balance between whitening the overall colored interference and matching to the multipath fading channel(s) in consideration of the available delay processing resources. Further, receiver complexity is reduced by using only the selected delays in the combining process.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of selecting a set of demodulation processing delays for received signal demodulation from a larger set of candidate delays including path delays and other delays, comprising:

forming a group of delays including some or all of the candidate delays;

calculating a combining weight magnitude for the group of delays based on channel estimates determined for the candidate delays included in the group of delays and impairment correlations between the candidate delays included in the group of delays;

iteratively reducing a number of candidate delays included in the group of delays by eliminating one or more of the candidate delays included in the group of delays based on the combining weight magnitude in an initial iteration, in one or more subsequent iterations recalculating the combining weight magnitude to reflect the elimination in a prior iteration of one or more of the candidate delays from the group of delays by removing entries from an impairment covariance matrix that correspond to the one or more candidate delays eliminated in the prior iteration, revising a channel coefficient vector by eliminating vector entries associated with the one or more candidate delays eliminated in the prior iteration and calculating combining weights using the recalculated impairment covariance matrix and the revised channel coefficient vector, and eliminating one or more of the candidate delays remaining in the group of delays based on the combining weight magnitude as recalculated in the current iteration; and setting the processing delays for received signal demodulation to the candidate delays remaining in the group of delays after reduction.

2. The method of claim 1, wherein recalculating an impairment covariance matrix by removing entries from the impairment covariance matrix that correspond to the one or more candidate delays eliminated in the prior iteration comprises subtracting from a portion of an inverse impairment covariance matrix a scaled version of an outer product of a vector associated with each of the candidate delays eliminated in the prior iteration.

3. The method of claim 2, wherein subtracting from the portion of an inverse impairment covariance matrix a scaled version of an outer product of a vector associated with each of the candidate delays eliminated in the prior iteration comprises:

modifying the inverse impairment covariance matrix by exchanging rows and columns of the matrix until the last column of the matrix contains entries associated with one of the candidate delays eliminated in the prior iteration;

subtracting from a portion of the modified inverse impairment covariance matrix the scaled version of the vector outer product associated with the candidate delay eliminated in the prior iteration; and repeating the operations of modifying and subtracting for each of the candidate delays eliminated in the prior iteration.

4. The method of claim 3, wherein modifying the inverse impairment covariance matrix by exchanging rows and columns of the matrix until the last column of the matrix contains entries associated with one of the candidate delays eliminated in the prior iteration comprises multiplying the inverse impairment covariance matrix with a permutation matrix and a transposed version of the permutation matrix.

5. The method of claim 1, wherein recalculating an impairment covariance matrix by removing entries from the impairment covariance matrix that correspond to the one or more candidate delays eliminated in the prior iteration comprises calculating an N–M square impairment covariance matrix, wherein the N–M square impairment covariance matrix is devoid of any entries associated with M candidate delays eliminated in the prior iteration.

6. The method of claim 1, wherein the combining weights comprise one of Generalized RAKE combining weights or chip equalization filter tap coefficients.

7. The method of claim 1, wherein the demodulation processing delays correspond to one of Generalized RAKE finger delays and equalization filter tap delays.

8. The method of claim 1, comprising, in the initial iteration, eliminating one or more of the candidate delays included in the group of delays having a smallest combining weight calculated in the initial iteration.

9. A receiver comprising an antenna and a baseband processor configured to select a set of demodulation processing delays for received signal demodulation from a larger set of candidate delays including path delays and other delays by forming a group of delays including some or all of the candidate delays, calculate a combining weight magnitude for the group of delays based on channel estimates determined for the candidate delays included in the group of delays and impairment correlations between the candidate delays included in the group of delays, iteratively reduce a number of candidate delays included in the group of delays by eliminating one or more of the candidate delays included in the group of delays based on the combining weight magnitude in an initial iteration, in one or more subsequent iterations recalculating the combining weight magnitude to reflect the elimination in a prior iteration of one or more of the candidate delays from the group of delays by removing entries from an impairment covariance matrix that correspond to the one or more candidate delays eliminated in the prior iteration, revising a channel coefficient vector by eliminating vector entries associated with the one or more candidate delays eliminated in the prior iteration and calculating combining weights using the recalculated impairment covariance matrix and the revised channel coefficient vector, and eliminating one or more of the candidate delays remaining in the group of delays based on the combining weight magnitude as recalculated in the current iteration, and set the processing delays for received signal demodulation to the candidate delays remaining in the group of delays after reduction.

10. The receiver of claim 9, wherein the combining weights comprise one of Generalized RAKE combining weights or chip equalization filter tap coefficients.

11. The receiver of claim 9, wherein the demodulation processing delays correspond to one of Generalized RAKE finger delays and equalization filter tap delays.

12. A wireless communication device comprising the receiver according to claim 9.

13. The receiver of claim 9, wherein the baseband processor is configured to iteratively reduce the number of candidate delays included in the group of delays by, in the initial iteration, eliminating one or more of the candidate delays included in the group of delays having a smallest combining weight calculated in the initial iteration.

* * * * *